UNITED STATES PATENT OFFICE.

GEORGE T. HANSEN, OF SALT LAKE CITY, UTAH.

METALLURGICAL PROCESS.

1,361,459.   Specification of Letters Patent.   Patented Dec. 7, 1920.

No Drawing.   Application filed January 10, 1919.   Serial No. 270,563.

*To all whom it may concern:*

Be it known that I, GEORGE T. HANSEN, a citizen of the United States, residing at Salt Lake City, in the county of Salt Lake and State of Utah, have invented a certain new and useful Improvement in Metallurgical Processes, of which the following is a full, clear, concise, and exact description, such as will enable those skilled in the art to understand and practice same.

My invention relates to improvements in metallurgical processes and has special reference to improved means and processes for the precipitation of copper from cyanid solutions such as are employed in the extraction of gold, silver and copper from ores containing copper.

In the well known cyanid process of gold extraction, the pulverized ore is treated or leached with an aqueous solution of potassium cyanid or sodium cyanid, which combines with the gold, forming gold cyanid or a double cyanid, which is soluble in water, and then the gold is precipitated by means of metallic zinc, aluminum, etc., which baser metals replace the gold in the compound, setting the gold free and which is therefore precipitated.

One apparently insurmountable difficulty in the successful application of the cyanid process to the extraction of gold from ores containing copper, in any appreciable quantity, has been that the cyanid of potassium solution dissolves the copper with the same readiness that it does the gold and silver. In the treatment of ores containing copper in appreciable proportions the cost of the cyanid solution, which has to be provided for combination with the copper, is prohibitive and consequently large quantities of gold and silver contained in valuable bodies of ore and especially tailings from other methods of gold extraction have not been reclaimed and are practically lost. Particularly is this true as there has heretofore been no adequate means which could be applied cheaply enough for extracting or precipitating the copper and thus regenerating the cyanid solution.

In the cyanid process the gold is readily precipitated by flowing the cyanid solution through zinc boxes, or passing it through zinc in finely divided form such as turnings, shavings or dust, but at the ordinary temperatures which have heretofore been employed the precipitation of the copper and the consequent regeneration of the cyanid solution combined with the copper, the amount of copper precipitated is too small to be of any economic value.

In the cyanid process, the cyanid solution which is regenerated by the precipitation of the gold, is returned for further use, but heretofore that portion of the solution which is combined with the copper has been lost and had to be replaced by the addition of new or fresh solution.

By means of my improvements I am enabled not only to reclaim the potassium or sodium cyanid solution which disappears in combination with the copper and thus make it available for further use, but I am also able to precipitate and retain the copper, thus not only reducing the expense of solutions, but also producing a valuable asset in the form of the copper reclaimed or extracted.

The particular object of my invention is to reduce the cost of extracting gold and silver by the cyanid process, when copper is present so as to make it practical to use this simple process for the reclamation of gold and silver from the untold quantities of such ore and certainly from the almost immeasurable quantities of such ore contained in the tailings from the other methods of gold extraction such as the amalgamation process.

My invention consists in the addition to the well known cyanid process of gold separation where the solutions are used at ordinary temperatures, the further step of heating the used solution to a temperature of substantially 90 deg. F. or higher and then the treatment of this hot solution by zinc or some similar metal, thus causing the precipitation of the copper carried by the solution and the regeneration of the potassium or sodium cyanid for further use in the extraction of gold.

The range of temperatures, which I use, is from substantially 90 deg. F. to the boiling point of the solution. The temperature of the boiling point depends, of course, upon the pressure to which the solution is subjected, that is, whether the pressure is atmospheric or artificial.

I have found that the heating of the cyanid solutions as above described, renders the copper in the solution amenable to precipitation by any of the well known methods, such as treatment with metallic zinc in any form, metallic aluminum in any form, or sodium, potassium, calcium or magnesium amalgam, or by electrolysis. As a direct result of the precipitation of the copper from such cyanid solutions, other compounds of cyanogen and other metals, such as potassium, sodium, calcium, magnesium or double cyanids of these metals with zinc, aluminum, etc., are liberated from combination with the copper, or are formed by secondary reactions with other chemical compounds found in such solutions used for the extraction of gold, silver and copper from their ores, such as the hydroxids of sodium, potassium, calcium or magnesium.

These cyanid compounds liberated or formed during the precipitation of the copper from the hot solution, are active solvents for gold, silver and copper and are consequently of value in the further extraction of gold, whereas the copper cyanid compounds are substantially inert or of very little value for such work.

Thus I am enabled to liberate or produce a liberation of useful cyanid compounds, in cyanid solutions for the extraction of gold, silver and copper from their ores, and a lower net consumption of cyanid of potassium, sodium, calcium, or magnesium, such as are ordinarily added to the solution to maintain it at proper working strength.

In practising my improved process, I make use of a solution of a cyanid of one of the alkaline metals such as potassium or sodium, or a mixture of these, such as is ordinarily used in the cyanid process of extracting gold. The strength of the solution may vary from a trace to a 10% solution.

After the ore in a finely divided state is leached with a solution as in the ordinary manner of extracting gold in the cyanid process, I preferably first subject the solution to the action of one of the base metals such as zinc or aluminum, by running the solution at ordinary temperature, through pans or through a mass of turnings or metallic dust, or in other well known ways, thus causing a precipitation and extraction of the gold and silver. As explained hereinbefore and as well known, the copper is not separated to any appreciable degree, by this treatment with zinc, aluminum, etc. Then I heat the solution as described, to substantially 90 deg. F. or higher and treat it again with zinc or aluminum, and I am now enabled to precipitate the copper and regenerate the bulk of the solution for further use.

While I prefer to thus deposit the copper separate from the gold and silver, such separate deposition is not a necessity as I may and frequently do heat the freshly leached solution before subjecting it to the action of the zinc or aluminum, thus causing the precipitation of the gold, silver and copper at the same time.

It should be understood that while I have described my method of regenerating the cyanid solution as being effected by the treatment of the hot solution by zinc or aluminum, my invention is not thus limited. I have found that the copper can readily be separated or precipitated from the hot solution by any of the well known methods used in the precipitation of gold and silver, such as a similar treatment with any of the alkaline metals, by the amalgam processes or by electrolysis.

As various modifications of my invention will readily suggest themselves to one skilled in the art, I do not limit my invention to the specified steps herein described.

I claim:

1. The herein described improved process of extracting gold, silver and copper from their ores which consists in leaching the ore with a solution of cyanid of potassium at ordinary temperatures, collecting the solution and heating it to a temperature of 90 deg. F. or higher and finally subjecting the hot solution to the action of a metal such as zinc, aluminum, etc., thereby causing the precipitation of the copper.

2. The herein described improved process of extracting copper from gold or silver ores containing copper, which consists in leaching the ore in a finely divided state with a weak solution of a cyanid of one of the alkaline metals, thus producing cyanid of gold, silver or copper, then heating the solution to a relatively high temperature, and finally treating the hot solution with one of the base metals such as zinc, thereby precipitating the copper and regenerating the cyanid solution.

3. The herein described improved method of regenerating cyanid solutions used in the extraction of gold and silver from their ores, which also contain copper in appreciable quantities, which consists in heating the solution, after leaching the ore, to a relatively high temperature and while the solution is still hot, causing it to flow in contact with a base metal such as zinc, thereby precipitating the copper from the solution.

4. The herein described improvement in metallurgical processes, which consists in leaching a copper carrying ore in finely divided form with an aqueous solution of cyanid of an alkaline metal, thereby forming a soluble compound of copper and collecting the solution, heating the solution to a temperature of 90 deg. F. or higher and while the solution is hot, subjecting it to the action of one of the base metals, such as zinc, thereby precipitating copper and reproducing cyanids of alkaline metals for further use.

5. The herein described improved process of regenerating cyanid solutions which have been used in the cyanid process of extracting gold from gold ore containing copper, which consists in treating the solution with zinc at ordinary temperatures to remove the gold, heating the solution to a relatively high temperature and treating the hot solution with zinc or some similar base metal to cause the precipitation of the copper and the regeneration of the cyanid solution.

6. In the cyanid treatment of gold and silver ores containing copper which includes leaching the ore with a cyanid solution and precipitating the metals from such solution, the additional step of heating the cyanid solution to 90° F. or higher before the precipitation of the copper.

7. In the cyanid treatment of copper bearing ores which includes leaching the ore with a cyanid solution and precipitating the copper from such solution, the additional step of heating the cyanid solution after the leaching operation and before the precipitation of the copper.

8. The improved process of treating cyanid solutions containing copper which includes heating the solution to 90° F. or higher and treating the hot solution with a base metal to precipitate the copper and regenerate the cyanid.

In witness whereof, I hereunto subscribe my name this 19th day of December, A. D. 1918.

GEORGE T. HANSEN.